United States Patent Office 3,331,964
Patented July 18, 1967

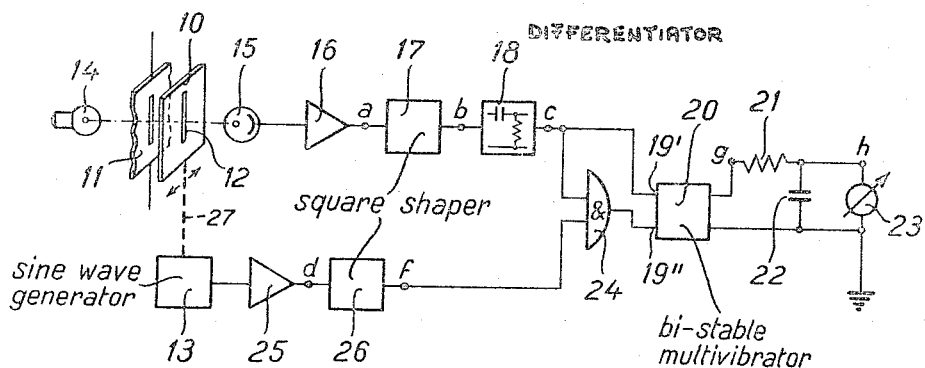
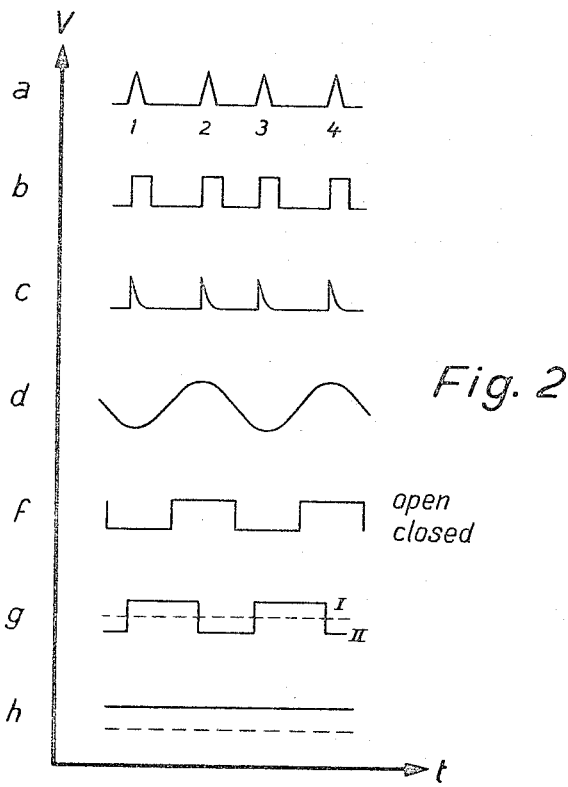

3,331,964
PHOTOSENSITIVE APPARATUS FOR DETERMINING SCALE POSITIONS
Klaus Heinecke and Werner Holle, Wetzlar (Lahn), Germany, assignors to Ernst Leitz G.m.b.H., Wetzlar (Lahn), Germany
Filed Feb. 17, 1964, Ser. No. 345,359
Claims priority, application Germany, Feb. 23, 1963, L 44,201
10 Claims. (Cl. 250—232)

The present invention relates to a measuring device and more particularly to an indicating measuring device of the character wherein the relative spacial positions of an indicator may be accurately determined with respect to a controlled scanning device as to deviations from a predetermined null position.

Such devices are desirable wherein it is required to continually measure, record, and otherwise provide for the corrective positioning of an indicator as to its setting either manually or automatically; such as, in remotely positioned devices where it is not convenient nor permissible to make corrective adjustments at the location.

A still further use would be in unattended devices wherein it is desired to continually measure, and record deviated positions of an indicator as to amplitude, frequency, and direction of deviations from a preselected null position during a specific time interval.

An object of the present invention is to provide a device wherein the information as to relative positions of the indicator with respect to the scanning device is obtained in the form of timed spacings of signals.

Another object of the present invention is the provision of only one conversion channel whereby the tolerances of the individual circuit components may be largely ignored, and when it is not necessary to use control signals for a phase sensitive rectifier circuit.

A further object of the present invention is the provision of a device that is insensitive to phase shifting, scanning irregularities and voltage fluctuations of the control circuit.

A still further object is the provision of a device which is easily and inexpensively constructed with fewer component parts and which comprises a unit having superior performance over similar prior known devices.

Other objects and advantages will become more apparent upon reference to the following specifications taken in connection with the accompanying drawings wherein:

FIGURE 1 shows diagrammatically the apparatus and circuit elements of the present device.

FIGURE 2 shows the forms of the signal impulses at the various stations.

Referring to the drawings, FIGURE 1 illustrate a measuring device comprising a scanner 10 having a slotted aperture 12 therethrough. The scanner 10 is arranged for oscillatory lateral movement with respect to an indicator 11. The indicator 11 is preferably connected to a moveable member of a device (not shown) for taking continuous readings of certain conditions, such as, temperature, pressure, etc., and is also provided with a mark for example with a slot corresponding to the slotted aperture 12 of the scanner 10. A light source 14 is provided in close proximity to the indicator 11.

A photoelectric cell 15, the light source 14, the slotted apertures of the scanner 10, and the indicator 11, are arranged in alignment as will be seen in FIGURE 1. The output of the photoelectric cell 15 is serially connected to the input of an amplifier 16 whose output is serially connected to the input of a square shaper 17, for example a Schmitt-trigger. The square shaper 17 has its output serially connected to the input of the differentiator 18. Differentiator 18 has its output connected to an output circuit including digital circuit components 24 and 20. The output of the differentiator 18 has one line connected to one of the inputs 19' of a bistable multivibrator 20. The other line from the output of the differentiator 18 is connected to the input of an AND circuit 24. The output of the AND circuit is connected to the other one input 19" of the bistable multivibrator 20. The other input of the AND circuit 24 is serially connected to the output of a square shaper 26, its input being serially connected to the output of an amplifier 25. Amplifier 25 and square shaper 26 constitute an electrical pulse generator. The input of the amplifier 25 is serially connected to the output of a sine wave generator 13. The scanner 10 is drivingly connected to the sine wave generator 13 as illustrated in FIGURE 1.

The output of the bistable multivibrator 20 is delivered to an integrating circuit comprising a resistor 21 and a capacitor 22. The average DC voltage at the capacitor 22, which is proportional to that of the displacement of the indicator in relation to the null position of the scanner 10, will be indicated by an evaluator or meter 23.

As is apparent, the measuring information in this apparatus passes through a single transformation channel which, with the exception of the amplifier 16, consists of digital circuit elements. Additional phase sensitive rectifier means comprising two valved branches for determining the magnitude and sign of the mark on the indicator 11 relative to the null point is therefor not needed. The distance of the mark on the indicator 11 from the null point is indicated by the rectangular voltage produced at the output of the bistable multivibrator 20, which is measured as an average voltage. The sign of the displacement (+ or −) of the mark relative to the null point is determined by the phase position of the bistable multivibrator 20.

The measuring device functions in the following manner: Scanning of the indicator 11 by means of the scanner 10, which is driven in an oscillating manner by drive means comprising the sine wave generator 13 and suitable electromechanical means 27, produces triangular shaped light impulses which are received by the photoelectric cell 15 and converted thereby into corresponding electrical impulses. After passage through the amplifier 16 the impulses delivered at points a, FIGURE 1, will take the form as seen in line a, FIGURE 2.

After the impulses have been reshaped by the square shaper 17, line b, FIGURE 2, and then by the differentiator 18, they will have narrow impulses of shorter duration, as seen in line c of FIGURE 2, suitable for actuating the bistable multivibrator 20 to cause it to deliver an impulse of the shape as seen in line g of FIGURE 2.

The bistable multivibrator 20 is of such a construction that is is activated only through that input connection through which it was not actuated previously. The input 19" of the bistable multivibrator is connected to the output of the AND circuit 24. The AND circuit 24 will be energized first by a signal according to line c, FIGURE 2, and second by a signal according to line f, FIGURE 2. The oscillatory movement of the scanner 10 is always in direct relation to the sine wave generated by the generator 13. The voltage indicated at 23 (line h) is always proportional to the in-out ratio of the pulse train produced during the scanning.

The information as to the position of the indicator 11, preferably in relation to the null or central position of the scanner 10, is obtained from the time intervals between impulses.

The AND circuit 24 serves to prevent ambiguities as to the polarity of the impulses. It is possible for example that when the apparatus is switched in, the bistable multivibrator 20, after having been displaced 180° from the phase position of the scanner, may shift into the phase position of the latter, or that the bistable multivibrator 20 for some reason may be delayed during half an impulse period so as to cause a 180° phase shift. In such a case the voltmeter 23 would indicate voltages on the wrong side of the null position.

The bistable multivibrator 20 has two inlet terminals 19′, 19″ which are simultaneously energized by the positive impulse of line c in FIGURE 2. Only that input is effective which was not effective for the preceding transition of the stage.

It will now be assumed that the bistable multivibrator has been tripped into a setting I by an impulse 1 received at input 19′. If an impulse 2 (see FIG. 2, line l) now arrives, the positive going impulses will produce a signal at the input 19″ of the bistable multivibrator 20 which then trips into a setting II. An impulse 3 arriving at 19′ trips the bistable multivibrator back to setting I, conversely another impulse 4 arriving at 19″ trips the bistable multivibrator 20 to setting II etc. If for example an impulse 2 is not received the multivibrator remains in the setting I and an impulse 3 arriving at 19′ cannot trip the bistable multivibrator into the other setting, because first the AND circiut 24 is closed by the signal according to line f, FIGURE 2, and second the multivibrator still is in the setting attached to the input 19′. But another impulse 4 arriving at 19″ trips the bistable multivibrator to setting II etc.

As is apparent from FIGURE 1, if the indicator 11 drifts laterally in one direction or the other from the null or central position, the light impulses generated by the scanner 10 will vary in accordance as to spacing along the time axis a predetermined distance. This variation in the spacing of the impulses along the time axis determines the magnitude of displacement as well as the direction of displacement of the indicator 11 relative to its null position.

With the apparatus shown in the drawing, only one of the edges of the measuring impulses is used. The other edges however contain the same information, and the latter can be used in a further development of this invention by duplicating the differentiator 18, the AND circuit 24 and the bistable multivibrator 20. Both of the bistable multivibrators would then be connected to an integrator which will give the sum of the two rectangular voltages. With such a modified apparatus an increase of the measurement accuracy by $\sqrt{2}$ is obtained.

It will be understood that this invention is susceptible to modification in order to adapt it to different usages and conditions; and accordingly, it is desired to comprehend such modifications within this invention as may fall within the scope of the appended claims.

What we claim:

1. In a device for measuring the relative position of a mark as the displacement thereof from a predetermined null position, wherein the information as to the position of said mark with respect to said null position is transmitted in the form of impulses separated by time intervals, said device including movable indicator means incorporating said mark constituting the element whose position is to be measured, said indicator means being at least partially translucent, a light source positioned to direct light to said indicator means, scanning means having an aperture therethrough for receiving light from said indicator means, photoelectric means for receiving light signals from said light source that pass through said indicator means and the aperture, said photoelectric means being operable for converting said light signals into electrical impulses, drive means for oscillating said scanning means, and electrical pulse generator means driven by said drive means, the improvement comprising bi-stable multivibrator means connected to receive impulses from said photoelectric means and from said generator means, for switching said bi-stable multivibrator in time dependence on the displacement of said indicator means from a null position, as indicated by the time relationship between impulses from said photoelectric means and said generator means and evaluator means measuring the output from said bi-stable multivibrator.

2. A device for measuring the relative position of a mark according to claim 9 which includes first amplifier means for amplifying said impulses from said photoelectric means and second amplifier means for amplifying the output impulses from said electrical pulse generator.

3. A device for measuring the relative position of a mark according to claim 2 which includes square shaper means for shaping output impulses from said amplifier means.

4. A device for measuring the relative position of a mark as to the deviation therefrom from a predetermined null position, wherein the information as to the position of said mark with respect to said null position is transmitted in the form of impulses separated by time intervals which comprises; movable indicator means having an aperture therethrough, said indicator means forming the part whose position is measured, a light source positioned to direct light to said indicator means, scanning means having an aperture therethrough, photocell means for receiving signals from said light source that pass through said indicator and the aperture of the scanning means and operable for converting said signals into electric impulses, first amplifier means amplifying said impulses from said photocell means, first square shaper means for shaping the output impulses from said first amplifier means, drive means for oscillating said scanning means in parallel relation to said indicator means, sine wave generator means driven by said drive means, second amplifier means amplifying the output impulses from said sine wave generator means, second square shaper means shaping the output impulses from said second amplifier means, AND circuit means receiving impulses from the outputs of said first and said second square shaper means, bi-stable multivibrator means receiving impulses from the outputs of said first square shaper means and said AND circuit means, integrator means receiving impulses from the output of said bi-stable multivibrator means, and evaluator means measuring the polarity and magnitude of the output of said integrator means, said integrator means providing an average output therefor to said evaluator means.

5. A device for measuring the relative position of a mark as to the deviation thereof from a predetermined null position, wherein the information as to the position of said mark with respect to said null position is transmitted in the form of impulses separated by time intervals which comprises; movable indicator means having an aperture therethrough, said indicator means forming the part whose position is measured, a light source positioned to direct light to said indicator means, scanning means having an aperture therethrough, photocell means for receiving signals from said light source that pass through said indicator and the aperture of the scanning means and operable for converting said signals into electrical impulses, first amplifier means amplifying said impulses from said photocell means, first square shaper means for shaping the output impulses from said first amplifier means, drive means for oscillating said scanning means in parallel relation to said indicator means, sine wave generator means driven by said drive means, second amplifier means amplifying the output impulses from said sine wave generator means, second square shaper means shaping the output impulses from said second amplifier means, differentiator means shaping the impulses from the output of said first square shaper means, said differentiator means forming output impulses of shorter duration, AND circuit means, said output impulses of said differentiator being delivered to one input of said AND circuit means, the output of said second square shaper means being delivered to the other input of said AND circuit means, bi-stable multivibrator means receiving said impulses from the output of said differentiator and output impulses from said AND circuit means, indicator means receiving impulses from the output of said bi-stable multivibrator means, and evaluator means measuring the polarity and magnitude of the output of said integrator means, said integrator means providing an average output therefor to said evaluator means.

6. A device for measuring the relative position of a mark according to claim 5 wherein, said apertures are formed centrally in said indicator means and said scanning means and arranged in parallel alignment with respect to each other.

7. A device for measuring the relative position of a mark according to claim 5, wherein, said drive means, said scanning means, and said sine wave generator means are so constructed and arranged whereby said drive means provides oscillatory movement of said scanning means synchronous with respect to said sine wave generator means and said output impulses from said sine generator means.

8. A measuring device for measuring the relative position of a mark with respect to a predetermined null position including movable indicator means, mark means formed on said indicator means and constituting the part whose position is measured, scanner means arranged for controlled continuous oscillatory movement parallel to said indicator means and adjacent thereto and including means for producing output impulses relative to the position of said mark means, drive means connected to said indicator means, square shaper means providing continuous uniformly spaced output impulses and driven by said drive means in synchronism with said scanner means, and output means including digital circuit means connected to the outputs of said scanner and square shaper means for measuring the polarity and magnitude of deviation of said mark with respect to said null position.

9. A device for measuring the relative position of a mark as to the displacement thereof from a predetermined null position, wherein the information as to the position of said mark with respect to said null position is transmitted to the form of impulses separated by time intervals, said device comprising, in combination:

movable indicator means incorporating said mark constituting the element whose position is to be measured, said indicator means being at least partially translucent;

a light source located to direct light to said indicator means;

scanning means having an aperture therethrough for receiving light from said indicator means;

photoelectric means for receiving light signals from said light source that pass through said indicator means and said aperture, said photoelectric means being operable for converting said light signals into electrical impulses;

drive means for oscillating said scanning means;

electrical pulse generator means driven by said drive means;

bi-stable multivibrator means connected to receive impulses from said photoelectric means and from said generator means;

integrator means connected to the output of said bi-stable multivibrator means; and evaluator means coupled to the output of said integrator means.

10. Apparatus for measuring the displacement of an element from a predetermined null position, comprising, in combination:
 (a) means for illuminating said element;
 (b) means for periodically moving a scanning aperture across said element to generate light pulses whose timing is related to the position of said element;
 (c) means for changing said light pulses into corresponding electrical pulses;
 (d) means for generating electrical timing pulses in synchronism with the movement of said scanning aperture;
 (e) means for generating square wave signals whose pulse width is proportional to the time difference between said electrical timing pulses and the electrical pulses derived from said light pulses and whose polarity is dependent on the phase relationship between said two sets of pulses;
 (f) means for integrating said square wave signals; and
 (g) means for measuring the amplitude and polarity of the integrated signal to determine the displacement of said element from said predetermined null position.

References Cited
UNITED STATES PATENTS

| | | | |
|---|---|---|---|
| 2,742,151 | 4/1956 | Milford | 250—219 X |
| 3,066,225 | 11/1962 | Uphoff | 250—219 |
| 3,254,227 | 5/1966 | Hock | 250—232 X |

WALTER STOLWEIN, *Primary Examiner.*